United States Patent [19]

Berendt

[11] Patent Number: 4,731,092

[45] Date of Patent: Mar. 15, 1988

[54] PROCESS FOR PRINTING OR DYEING CELLULOSE-CONTAINING TEXTILE MATERIAL WITH REACTIVE DYES IN AQUEOUS FOAM PREPARATION CONTAINING ACRYLIC GRAFT CO-POLYMER

[75] Inventor: Hans-Ulrich Berendt, Allschwil, Switzerland

[73] Assignee: Ciba-Geigy Corporation, Ardsley, N.Y.

[21] Appl. No.: 40,664

[22] Filed: Apr. 20, 1987

[30] Foreign Application Priority Data

Apr. 30, 1986 [CH] Switzerland .................. 1771/86

[51] Int. Cl.$^4$ .............. D06P 1/52; D06P 3/66
[52] U.S. Cl. .............................. 8/477; 8/543; 8/549; 8/555; 8/558; 8/582; 8/609; 8/918
[58] Field of Search .................. 8/477, 543, 555, 558

[56] References Cited

U.S. PATENT DOCUMENTS 4,604,099  8/1986  Berendt et al. .................. 8/477

Primary Examiner—A. Lionel Clingman
Attorney, Agent, or Firm—Edward M. Roberts; Meredith C. Findlay

[57] ABSTRACT

Textile cellulose material is printed or dyed with reactive dyes with the aid of foam. The foam is applied by applying to the cellulose material a foamed, aqueous preparation which contains in addition to dyes and fixing alkalis (1) a foam-forming agent (2) a homopolymer or copolymer of acrylamide or methacrylamide or preferably a graft polymer which is obtained from an addition product of an alkylene oxide, preferably propylene oxide, on an at least trihydric aliphatic alcohol, e.g. glycerol, and acrylamide or methacrylamide, and (3) an anionic graft polymer which has as grafting base a copolymerization product from (A) an alkyl acrylate or methacrylate, the alkyl radical having at least 8 carbon atoms, with (B) a dicarboxylic acid diester of an ethylenically unsaturated aliphatic dicarboxylic acid and a polyethylene glycol, a terminal hydroxyl group of the diol having been etherified with a $C_1$–$C_4$-alkyl radical, and contains as graft constituent side chains which stem from grafted-on polymerizable monomers which contain hydrophilic groups.

The cellulose material thus treated is then subjected to a heat treatment, for example steaming, to fix the dye.

This very stable preparation produces without the use of thickenings a strong, level and crisp print which at the same time has an excellent handle.

17 Claims, No Drawings

PROCESS FOR PRINTING OR DYEING CELLULOSE-CONTAINING TEXTILE MATERIAL WITH REACTIVE DYES IN AQUEOUS FOAM PREPARATION CONTAINING ACRYLIC GRAFT CO-POLYMER

The present invention relates to a process for printing or dyeing cellulose-containing textile material with reactive dyes with the aid of foam.

It is known that cellulose fibre materials can be dyed with the aid of foamed print paste compositions. The colour components used therein are pigments or pigment preparations which are always combined with binders. These binder-containing compositions have the disadvantage that they impair handle.

In printing with reactive dyes, on the other hand, generally no binders are used. For that reason the handle is not affected. However, to obtain adequate crispness with reactive dyes it is necessary to use large amounts of thickeners. The disadvantage of using thickeners is that, after the printing step and fixation of the dye, they must be washed off again. This subsequent wash requires appreciable outlay on machinery and increases the consumption of energy, water and various chemicals.

EP-A-No. 151,091 or U.S. Pat. No. 4,604,099 proposes a foam print paste which is used without thickeners and produces excellent crispness. This foam print paste, which in addition to the dye and the foaming agent contains homopolymers, copolymers or graft polymers based on acrylamide or methacrylamide, generally has sufficient foam stability. However, owing to certain dye formulations, high shearing forces and long residence times in the application unit, the foam stability is insufficient in some cases.

It has now been found that the foam stability can be significantly improved by printing or dyeing cellulose-containing textile material using the process described hereinafter.

The present invention accordingly provides a process for printing or dyeing cellulose-containing textile material with reactive dyes by printing or dyeing the textile material with a foamed, aqueous preparation and fixing the dyes through the action of heat, the preparation containing reactive dyes, foaming agents, fixing alkalis, homopolymers or copolymers of acrylamide or methacrylamide or graft polymers which are obtainable from an addition product of an alkylene oxide onto an at least trihydric aliphatic alcohol having 3 to 10 carbon atoms and acrylamide or methacrylamide, wherein the preparation additionally contains graft polymers which possess as grafting base a copolymerization product from (A) an alkyl acrylate or methacrylate, the alkyl radical having at least 8 carbon atoms, with (B) a dicarboxylic acid diester of an ethylenically unsaturated aliphatic dicarboxylic acid and a polyethylene glycol, a terminal hydroxyl group of the diol having been etherified with a $C_1$–$C_4$-alkyl radical, and contain as graft constituent side chains of grafted-on polymerizable monomers which contain hydrophilic groups and which are preferably sulfonic acid or carboxyl groups.

The copolymers used as grafting base are preferably based on 1 mole of the dicarboxylic acid diester and 2 moles of alkyl acrylate or methacrylate.

The dicarboxylic acid ester is prepared by reacting the ethylenically unsaturated dicarboxylic acid or functional derivatives thereof, in particular anhydrides, with a monoetherified polyalkylene glycol.

Ethylenically unsaturated dicarboxylic acids advantageously have 4 to 10 carbon atoms and are preferably fumaric acid, maleic acid or itaconic acid, as well as mesaconic, citraconic or methylenemalonic acid. A suitable anhydride of these acids is in particular maleic anhydride, which is also the preferred starting component for preparing the dicarboxylic acid diester.

The esterification of the dicarboxylic acid is advantageously carried out with monoetherified diols of the formula $$HO-(CH_2CH_2)_{\overline{m}}R \qquad (1)$$

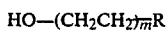

in which R is $C_1$–$C_4$-alkyl, e.g. isobutyl, isopropyl, propyl, ethyl and in particular methyl, and m is 5 to 100, advantageously 5 to 30 and preferably 8 to 20. Examples of such diols are polyethylene glycols having an average molecular weight of 350 to 4500, in particular 500 to 1000.

Suitable acrylic or methacrylic acid esters for use as component (A) are preferably derived from aliphatic monoalcohols having 8 to 22 carbon atoms. Suitable aliphatic monoalcohols of this type are natural alcohols, e.g. lauryl alcohol, myristyl alcohol, cetyl alcohol, stearyl alcohol, arachidyl alcohol or behenyl alcohol, as well as synthetic alcohols, e.g. oxo alcohols, e.g. 2-ethylbutanol, 2-methylpentanol, hexanol, heptanol, 5-methylheptan-3-ol, octan-2-ol, trimethylnonyl alcohol, decanol, hexadecyl alcohol or Alfols. Some representatives of the Alfols are Alfol (8–10), Alfol (9–11), Alfol (11–13), Alfol (10–14), Alfol (12–13) or Alfol (16–18).

The monoalcohols can be used individually or as mixtures.

Monomers with hydrophilic groups can be carboxylic acids, dicarboxylic acids or anhydrides thereof as well as sulfonic acids, which each have an ethylenically unsaturated aliphatic radical and preferably not more than 7 carbon atoms. The monocarboxylic acids are for example acrylic acid or methacrylic acid, α-haloacrylic acid, 2-hydroxyethylacrylic acid, α-cyanoacrylic acid, crotonic acid and vinylacetic acid. Ethylenically unsaturated dicarboxylic acids are preferably fumaric acid, maleic acid or itaconic acid, as well as mesaconic acid, citraconic acid, glutaconic acid and methylenemalonic acid. A suitable anhydride of these acids is in particular maleic anhydride. Examples of sulfonic acids of the type defined are vinylsulfonic acid and 2-acrylamido-2-methylpropanesulfonic acid. Preferably the monocarboxylic acids have 3 to 5 carbon atoms, in particular methacrylic acid and especially acrylic acid.

The monomers required for introducing side chains (or side branches) can be used individually or as mixtures. Preferred grafted-on monomer is acrylic acid.

The grafted polymers advantageously contain from 20 to 80% by weight of the defined grafting base and 80 to 20% by weight of grafted-on ethylenically unsaturated monomer, in particular acrylic acid, as side chains.

Preferably the graft polymers possess 25 to 50% by weight of the defined grafting base and 50 to 75% by weight of grafted-on acrylic acid as side chains.

The preparation of the graft polymers is effected in a conventional manner, advantageously by bringing together (1) a copolymer of a dicarboxylic acid ester and the alkyl acrylate or methacrylate with (2) an ethylenically unsaturated polymerizable monomer which contains hydrophilic groups, for example corresponding carboxylic acids, anhydrides thereof or sulfonic acids, and polymerizing in the presence of catalysts, advantageously at a temperature of 40° to 100° C.

This predominantly produces graft polymers in which the copolymerization product forms the main chain, which contains, on individual carbon atoms, the grafted-on ethylenically unsaturated monomer, in particular acrylic acid, in the form of side chains.

The catalysts used are advantageously organic or preferably inorganic initiators which form free radicals. Suitable organic initiators for carrying out the free radical polymerization are for example symmetrical peroxide dicarbonates, butyl peroctoates, butyl benzoates, peracetates or peroxide dicarbamates. Suitable inorganic initiators are hydrogen superoxide, perborates, persulfates or peroxide sulfates.

A preferred initiator or activator is potassium sulfate.

These catalysts can be used in amounts of 0.05 to 3% by weight, advantageously 0.1 to 2% by weight and preferably 0.2 to 1% by weight, based on the total weight of the starting materials.

The graft polymerization is advantageously carried out in an inert atmosphere, for example in a nitrogen atmosphere.

The graft polymers are obtained as solutions or as viscous materials. By diluting, more specifically, depending on the nature of the grafted-on monomers, by dissolving and diluting with water it is possible to prepare practical products having a solids content of for example 5 to 35% by weight, preferably 10 to 25% by weight.

The dosage levels in which such graft polymers are added alone or mixed to the preparations to be foamed can vary with the printing or dyeing process from 5 to 50 g/l in the form of 10 to 20% aqueous solutions. For instance, amounts from 20 to 40 g in the form of 15% aqueous solutions per liter of unfoamed preparation have advantageous utility.

The acrylamide- or methacrylamide-based polymers used according to the invention are preferably the acrylamide graft polymers of the type defined.

Preference is given to graft polymers which are obtainable by graft polymerization of methacrylamide or in particular acrylamide on a product of addition to 100 moles, preferably 40 to 80 moles, of propylene oxide onto trihydric to hexahydric alkanols having 3 to 6 carbon atoms. These alkanols can be straight-chain or branched. Examples are glycerol, trimethylolethane, trimethylolpropane, erythritol, pentaerythritol, mannitol or sorbitol.

Further suitable graft polymers are those which are prepared by grafting methacrylamide or acrylamide onto adducts of mixtures of ethylene oxide and propylene oxide or of ethylene oxide alone onto the polyhydric alcohols mentioned.

Particularly suitable graft polymers are in particular those of acrylamide and products of addition of 40 to 80 moles of propylene oxide onto 1 mole of glycerol.

The graft polymers used according to the invention advantageously contain 2.5 to 50% by weight of the defined addition product as main chain and 50 to 97.5% by weight of grafted-on methacrylamide or preferably acrylamide as side chains.

Preferably the graft polymers have 2.5 to 30% by weight of the alkylene oxide adduct of the type defined and 70 to 97.5% by weight of grafted-on methacrylamide or in particular acrylamide. More preferably, the amide content is 80 to 97.5% by weight, based on the graft polymer.

Of these products, those which contain as main chain 4 to 20% by weight of the product of addition of 40 to 80 moles of propylene oxide onto 1 mole of glycerol and 80 to 96% by weight of acrylamide are particularly preferred.

The stated percentages are based on the graft polymer as a whole.

The preparation of the acrylamide graft polymers used according to the invention is effected in a conventional manner, advantageously by polymerizing (1) a product of addition of an alkylene oxide onto an at least trihydric aliphatic alcohol of 3 to 10 carbon atoms with (2) acrylamide or methacrylamide and in the presence of catalysts, advantageously at a temperature of 40° to 100° C. The products obtained in this way are predominantly graft polymers in which the alkylene oxide adduct forms the main chain, which contains, on individual carbon atoms, the grafted-on acrylamide or methacrylamide in the form of side chains. Details concerning the preparation of the acrylamide graft polymers are described, for example, in European Patent Publication No. 151,091.

The dosage levels in which the acrylamide polymers required are added alone or mixed to the preparations to be foamed can vary with the printing or dyeing method from 0.5 to 20 g/l in the form of aqueous solutions. For instance, amounts having advantageous utility range from 0.5 to 20 g, advantageously from 0.5 to 10 g and preferably from 1 to 5 g, in the form of 2 to 10% aqueous solutions per liter of unfoamed preparation.

Application by foam is possible not only with the acrylamide graft polymers mentioned but also with linear or branched polymers of acrylamide or methacrylamide and copolymers of acrylamide or methacrylamide and further ethylenically unsaturated monomers, e.g. acrylic acid, methacrylic acid, α-haloacrylic acid, 2-hydroxyethylacrylic acid, α-cyanoacrylic acid, crotonic acid, vinylacetic acid, maleic acid, acrylonitrile, methacrylonitrile, vinyl alkyl ether (methyl vinyl ether, isopropyl vinyl ether), vinyl ester (vinyl acetate), styrene, vinyltoluene, vinylsulfonic acid, 2-acrylamido-2-methylpropanesulfonic acid or esters of said α,β-unsaturated carboxylic acids and in particular half-esters of maleic acid with products of addition of 2 to 15 moles of ethylene oxide onto monoalcohols having 8 to 22 carbon atoms. The weight ratio of the acrylamide to the other monomers preferably ranges from 9:1 to 1:1.

Suitable foam-forming agents are in general anionic or nonionic compounds having surface-active properties, which are referred to hereinafter as surfactants. Surfactants reduce the surface tension of solutions, thereby facilitating and stabilizing foam formation. Both anionic and nonionic surfactants can be present as individual compounds, as mixtures with their own kind or as combinations of anionic and nonionic surfactants.

Suitable anionic surfactants are for example:
sulfated aliphatic alcohols whose alkyl chain has 8 to 18 carbon atoms, e.g. sulfated lauryl alcohol;
sulfated unsaturated fatty acids or fatty acid lower alkyl esters which have 8 to 20 carbon atoms in the fatty radical, for example ricinoleic acid, or oils containing such fatty acids, for example castor oil;
alkylarylsulfonates having one or two straight-chain or branched alkyl chains having in total at least 6 carbon atoms, e.g. dodecylbenzenesulfonates, dibutylnaphthalenesulfonates or 3,7-diisobutylnaphthalenesulfonates;

sulfonated 1-benzyl-2-alkylbenzimidazoles having 8 to 22 carbon atoms in the alkyl radical;

sulfonates of polycarboxylic acid esters, for example dioctylsulfosuccinates or sulfosuccinamides;

the "soap" alkali metal, ammonium or amine salts of fatty acids having 10 to 20 carbon atoms, for example rosin salts;

esters of polyalcohols, in particular monoglycerides or diglycerides of fatty acids having 12 to 18 carbon atoms, for example monoglycerides of lauric, stearic or oleic acid, and acid esters formed from organic dicarboxylic acids, for example maleic acid, malonic acid or sulfosuccinic acid, but preferably inorganic polybasic acids, for example o-phosphoric acid or in particular sulfuric acid, and products of addition of 1 to 60, preferably 2 to 30, moles of ethylene oxide and/or propylene oxide onto fatty amines, fatty amides, fatty acids or fatty alcohols having 8 to 22 carbon atoms each, onto alkylphenols having 4 to 16 carbon atoms in the alkyl chain, o-phenylphenol, benzylphenol or onto trihydric to hexahydric alkanols having 3 to 6 carbon atoms.

The acid radical of these anionic surfactants is in general present in the form of a salt, i.e. as an alkali metal, ammonium or amine salt. Examples of these salts are lithium, sodium, potassium, ammonium, trimethylamine, ethanolamine, diethanolamine or triethanolamine salts.

Anionic surfactants which are highly suitable for use as foam-forming agents are (1) acid esters, or salts thereof, of a polyadduct of 2 to 15 moles of ethylene oxide on 1 mole of fatty alcohol having 8 to 22 carbon atoms or on 1 mole of alkylphenol having 4 to 12 carbon atoms in the alkyl radical;

(2) alkylsulfates whose alkyl chain contains 8 to 20 carbon atoms, for example laurylsulfate;

(3) alkylphenylsulfonates having 8 to 18 carbon atoms in the alkyl radical; or (4) dialkylnaphthalenesulfonates having 3 to 5 carbon atoms per alkyl radical.

Components (1) to (4) can be used alone or as mixtures with one another as foam-forming agents.

The nonionic surfactant is advantageously a nonionic alkylene oxide addition product of 1 to 100 moles of alkylene oxide, for example ethylene oxide and/or propylene oxide, on 1 mole of an aliphatic monoalcohol having at least 4 carbon atoms, of a 3- to 6-hydric aliphatic alcohol, of a phenol which can be substituted by alkyl or phenyl, or of a fatty acid having 8 to 22 carbon atoms.

Nonionic surfactants are for example:

fatty alcohols having 8 to 22 carbon atoms, in particular cetyl alcohol;

addition products of preferably 2 to 80 moles of alkylene oxide, in particular ethylene oxide, it being possible for individual ethylene oxide units to be replaced by substituted epoxides, such as styrene oxide and/or propylene oxide, on higher unsaturated or saturated monoalcohols, fatty acids, fatty amines or fatty amides having 8 to 22 carbon atoms or on phenylphenol or alkylphenols whose alkyl radicals have at least 4 carbon atoms;

alkylene oxide, in particular ethylene oxide and/or propylene oxide, condensation products (block polymers);

reaction products of a fatty acid having 8 to 22 carbon atoms and a primary or secondary amine having at least one hydroxy lower alkyl or lower alkoxy lower alkyl group, or alkylene oxide addition products of these hydroxyalkyl-containing reaction products, the reaction being effected in such a way that the molecular mixing ratio between hydroxyalkylamine and fatty acid can be 1:1 and greater than 1, for example 1:1 to 2:1, and addition products of propylene oxide on a trihydric to hexahydric aliphatic alcohol of 3 to 6 carbon atoms, for example glycerol or pentaerythritol, the polypropylene oxide adducts having an average molecular weight of 250 to 1800, preferably 400 to 900.

Nonionic surfactants which are highly suitable for use as foam-forming agents are:

(5) addition products of 2 to 15 moles of ethylene oxide on 1 mole of an aliphatic monoalcohol or fatty acid having 8 to 22 carbon atoms each or on 1 mole of alkylphenol having a total of 4 to 12 carbon atoms in the alkyl moiety, in particular the addition product of 2 moles of ethylene oxide on 1 mole of cetyl alcohol;

(6) fatty acid alkanolamides having 8 to 22 carbon atoms in the fatty acid radical and 2 to 6 carbon atoms in the alkanol moiety.

Further highly suitable nonionic surfactants are block polymers of the formula

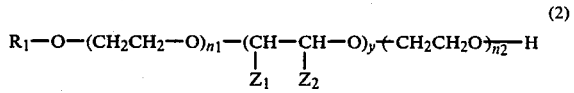

(2)

$$R_1-O-(CH_2CH_2-O)_{n_1}-(CH-CH-O)_y-(CH_2CH_2O)_{n_2}-H$$
$$\phantom{R_1-O-(CH_2CH_2-O)_{n_1}-(}Z_1\ \ Z_2$$

or of the formula

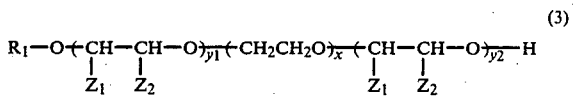

(3)

$$R_1-O-(CH-CH-O)_{y_1}-(CH_2CH_2O)_x-(CH-CH-O)_{y_2}-H$$
$$\phantom{R_1-O-(}Z_1\ \ Z_2\phantom{-(CH_2CH_2O)_x-(}Z_1\ \ Z_2$$

in which $R_1$ is hydrogen, alkyl or alkenyl having at most 22 carbon atoms, preferably 8 to 16 carbon atoms, o-phenylphenyl or alkylphenyl having 4 to 12 carbon atoms in the alkyl moiety, one of $Z_1$ and $Z_2$ is hydrogen and the other methyl, y is 1 to 75, preferably 3 to 50, and x is 1 to 30, and the total of $n_1+n_2$ is 3 to 50, preferably 3 to 30, and of $y_1+y_2$ is 2 to 30, preferably 4 to 20, and $n_2$ and $y_2$ can also be 0.

Preferred block polymers of the formula (2) are those in which $R_1$ is alkyl or alkenyl of 4 to 18, preferably 8 to 16, carbon atoms, y is 1 to 30, preferably 3 to 15, $n_1$ is 3 to 30 and $n_2$ is 0.

Particularly advantageous block polymers are fatty alcohol polyglycol coethers, in particular addition products of 3 to 30 moles of ethylene oxide and 3 to 30 moles of propylene oxide on aliphatic monoalcohols of 8 to 22 carbon atoms, preferably alkanols of 8 to 16 carbon atoms.

These block polymers are advantageously based on 10 to 50 percent by weight of units derived from ethylene oxide and 50 to 90 percent by weight of units derived from propylene oxide and have a molecular weight of 300 to 7000, in particular 350 to 3500.

The nonionic surfactants used can further be siloxaneoxyalkylene copolymers. These polymers are reaction products of halogen-substituted organopolysiloxanes and alkali metal salts of polyoxyalkylene, for example polyethylene glycol or polypropylene glycol. Such compounds are described for example in European Patent Specification Nos. 30,919 or 49,832.

Prefered block polymers and siloxane-oxyalkylene copolymers which are used as foam-forming agents or foam moderators advantageously have a cloud point of 15° to 70° C., preferably 25° to 50° C. The cloud point is determined in accordance with for example DIN 53,917.

The foam-forming agents used according to the invention are preferably used in the form of mixtures of the abovementioned anionic and/or nonionic surfactants.

In addition to the anionic and/or nonionic surfactants mentioned, the foam-forming mixtures can contain quaternary ammonium salts. The latter can be prepared for example by reacting aliphatic fatty amines with alkyl or alkenyl radicals having 8 to 24 carbon atoms, for example dodecylamine, hexadecylamine, heptadecylamine, octadecylamine, tallow fatty amine, behenylamine or oleylamine or diamines and triamines, for example dodecylpropylenediamine, octadecylethylenediamine and octadecyldiethylenetriamine, with 1 to 35 equivalents of an alkylene oxide, for example propylene oxide or in particular ethylene oxide or a mixture of propylene oxide and ethylene oxide and facultatively additionally with 1 to 2 equivalents of styrene oxide and by subsequent reaction with customary quaternizing agents, for example methyl, ethyl or benzyl halide, diethyl sulfate and in particular dimethyl sulfate, halohydrins, halocarboxamides, for example chloroacetamide.

It is also possible to use mixtures of these cationic assistants.

Cationic assistants of particularly good utility are quaternization products of dimethyl sulfate, diethyl sulfate or $C_1$-$C_2$-alkyl halides, for example methyl chloride or iodide, with addition products of 2 to 35 moles of ethylene oxide with or without an additional 1 mole of styrene oxide on alkylamines or alkenylamines having 12 to 24 carbon atoms or mixtures thereof.

Preferred mixtures of foam-forming agents are for example combinations of components (1), (2), (3), (4), (5) and (6) and in particular those of (A) alkylsulfonates having 8 to 20 carbon atoms and fatty alcohols having 12 to 22 carbon atoms or addition products of 1 to 4 moles of ethylene oxide on these fatty alcohols, (B) addition products of 2 to 12 moles of ethylene oxide on 1 mole of alkylphenol having 4 to 12 carbon atoms in the alkyl moiety, sodium salts of sulfuric acid esters of fatty alcohol/ethylene oxide adducts having 10 to 22 carbon atoms in the alcohol moiety and 2 to 4 ethylene oxide units, and fatty acid diethanolamides having 8 to 18 carbon atoms in the fatty acid radical, (C) addition products of 1 to 15 moles of ethylene oxide on 1 mole of fatty alcohol having 12 to 22 carbon atoms and fatty acid diethanolamides having 8 to 18 carbon atoms in the fatty acid radical, (D) sodium salts of sulfuric acid esters of fatty alcohol/ethylene oxide adducts having 10 to 22 carbon atoms in the alcohol moiety and 2 to 4 ethylene oxide units, fatty acid diethanolamides having 8 to 18 carbon atoms in the fatty acid radical and if desired addition products of 1 to 4 moles of ethylene oxide on $C_{12}$–$C_{22}$-fatty alcohols, (E) sodium salts of sulfuric acid esters of fatty alcohol/ethylene oxide adducts having 10 to 22 carbon atoms in the alcohol moiety and 2 to 4 ethylene oxide units, fatty acid diethanolamides having 8 to 18 carbon atoms in the fatty acid radical, alkylbenzenesulfonates having 8 to 12 carbon atoms in the alkyl moiety and if desired additionally the disodium salt of 1-benzyl-2-$C_{17}$–$C_{18}$-alkylbenzimidazoledisulfonic acid, (F) a sulfuric acid ester, or salts thereof, of an addition product of 2 to 15 moles of ethylene oxide on 1 mole of an aliphatic monoalcohol having 8 to 18 carbon atoms or in particular on 1 mole of an alkylphenol having 4 to 12 carbon atoms in the alkyl radical, and an addition product of 3 to 10 moles of ethylene oxide and 3 to 10 moles of propylene oxide on 1 mole of an aliphatic monoalcohol having 8 to 16 carbon atoms, or (G) a sulfuric acid ester, or salts thereof (in particular diethanolamine salts), of an addition product of 2 to 15 moles of ethylene oxide on 1 mole of an aliphatic monoalcohol having 8 to 18 carbon atoms, a fatty acid diethanolamide having 8 to 18 carbon atoms in the fatty acid radical, a dialkylnaphthalenesulfonate having 3 to 5 carbon atoms per alkyl radical with or without an addition product of 2 to 80 moles of ethylene oxide on 1 mole of fatty alcohol having 12 to 22 carbon atoms and/or an addition product, quaternized with dimethyl sulfate, of 1 mole of styrene oxide and 10 to 30 moles of ethylene oxide on 1 mole of fatty amine having 12 to 22 carbon atoms.

The foam-forming mixtures can be prepared by simply stirring the components with water. If desired, the foam-forming agents can be added to the treatment liquors in the form of one or more mixtures. These individual mixtures can also serve as foam moderators, foam stabilizers or wetting agents.

The dosage levels in which the foam-forming agents, preferably in the form of mixtures, are added to the preparations vary with the printing or dyeing method from 5 to 200 g, preferably from 10 to 100 g, per liter of the treatment preparation to be foamed.

The dyes used in the process according to the invention are the reactive dyes customarily used for dyeing or printing cellulose textile materials.

Reactive dyes are to be understood as meaning the usual dyes which enter a chemical bond with the cellulose, for example the "Reactive Dyes" listed in the Colour Index in volume 3 (3rd edition, 1971) on pages 3391–3560 and in volume 6 (revised 3rd edition, 1975) on pages 6268–6345.

The amount of dye generally depends on the desired depth of shade and advantageously varies from 1 to 400 g per liter of preparation, advantageously from 5 to 300 and preferably from 10 to 200 g/l of preparation (print paste or dyeing liquor).

To fix the reactive dyes, the preparations generally contain alkalis. Suitable alkaline compounds are for example sodium carbonate, sodium hydroxide, disodium phosphate, trisodium phosphate, borax, aqueous ammonia or alkali donors, e.g. sodium trichloroacetate or sodium formate. The alkali used can also be a mixture of sodium silicate and a 25% aqueous sodium carbonate solution.

The pH value of alkali-containing preparations is in general 7.5 to 13.2, preferably 8.5 to 11.5.

The process according to the invention is suitable in particular for printing textiles which consist of or contain cellulose.

Suitable cellulose material is regenerated or in particular natural cellulose, e.g. viscose staple, viscose filament, cellulose acetate, hemp, linen, jute or preferably cotton, as well as fibre blends, for example those of polyamide/cotton or in particular polyester/cotton, the polyester portion being simultaneously printable or dyeable with disperse dyes.

The textile material is applicable in any form, for example as yarn, hank, woven or knitted fabric, felt, preferably in the form of textile sheet structures such as woven or knitted fabrics which consist wholly or partly of natural, regenerated or modified cellulose.

The print pastes or dye liquors to be foamed are advantageously prepared by dissolving the dye and by adding the acrylic acid and acrylamide polymers, the foam-forming agents and alkali. Depending on the dye used, the print pastes or dye liquors can contain further customary additives, for example electrolytes, glycerol, urea, oxidants, for example nitrobenzenesulfonate or sodium chlorate, sequestrants or, depending on the print paste or dye liquor, wetting agents as well. The addition of thickeners is not necessary.

The foams can be produced on commercially customary foaming apparatus, if desired in a continuous manner.

According to the invention, foams having a good utility have a weight per liter of 65 to 350 g, preferably 150 to 250 g.

The foams used according to the invention are thick, dense and stable, i.e. they last and they are usable for a long time. Preferably the foams used according to the invention have a drop outflow time (DOT) of 30 minutes to 100 hours, preferably 1 to 50 hours. The bubble diameter in the foams is about 1 to $100\mu$.

The foams can be applied uniformly to the fibre materials by various application techniques. Examples of some possibilities are: sucking in, roll coating (on one or both sides), blowing in, pressing in or printing. The foam paste can be applied using the machines customary in textile printing, for example screen or roller printing machines. Advantageously the foam is applied by means of a screen printing machine, preferably in an enclosed system. Systems of this type are described for example in German Offenlegungsschriften Nos. 3,034,802 and 3,034,803.

The foams are advantageously applied at a temperature of 10° to 90° C., in general at room temperature, i.e. at about 15° to 30° C. Based on the treated fabric, the foam addon is in general 10 to 120, in particular 15 to 50, percent by weight.

The foam can be applied out of a foam vessel, preferably with an adjustable doctor blade, via an application roll to the front face of the fabric. On contact with the fabric the foam is immediately dewatered. If desired, the foam application can be repeated on the reverse side of the fabric. In this case, intermediate drying between the application to the front face and the reverse face is not necessary. It is also possible to apply different print foams to the front and back of the textile.

Preferably the foam application according to the invention is effected by first foaming the treatment preparation in a suitable apparatus in an enclosed system, for example under superatmospheric pressure, and transporting the resulting foam by means of pipes to the application apparatus. The foam is then applied, preferably by means of a sieve or a sievelike support, to the textile sheet structure, whereupon the foam is sucked into the textile material by mechanical imprinting, impressing or knife-coating. The sieve or sievelike support used can be a perforated sheet of metal, a lattice, network, wire mesh, sieve drum or a screen.

In the course of the procedures mentioned, the foam structure is destroyed, with bursting of the foam bubbles, whereupon the foam becomes dewatered and the textile material is uniformly wetted.

After the foam has been applied and dewatered, the printed or dyed textile material is preferably dried and then subjected to a heat treatment process in order to complete the dyeings (more specifically, to fix the dye).

The heat treatment can be carried out as a hot dwell process, as a thermosoling process or preferably as a steaming process.

In the steaming process, the textile materials printed with the coloured foam are subjected to a treatment in a steamer with what may be superheated steam, advantageously at a temperature of 98° to 210° C., preferably 100° to 180° C. and ideally 100° to 120° C.

In the hot dwell process, the material is dwelled in the moist state, advantageously at temperatures of 85° to 102° C., for example for 5 to 120 minutes. In this process, the printed material can be preheated to 85° to 102° C. by means of an infrared treatment. Preferably the dwell temperature is 95° to 100° C.

Finishing of the prints or dyeings by means of the so-called thermosoling process can take place at a temperature of for example 100° to 210° C. with or without prior intermediate drying. Preferably thermosoling takes place at a temperature of 120° to 210° C., preferably 140° to 180° C., and after an intermediate drying at 80° to 120° C. of the printed material. Depending on the temperature, thermosoling can take 20 seconds to 5 minutes, preferably 30 seconds to 4 minutes.

After the dyeing process the dyed cellulose-containing textile material can be washed off in a conventional manner in order to remove unfixed dye. To this end the substrate is treated for example at between 40° C. and the boil in a solution which contains soap or synthetic washing agent. This can be followed by a treatment with a fixing agent in order to improve the wet fastness properties.

The process according to the invention produces level and strong coloured prints which have improved crispness, a good handle and excellent appearance. Furthermore, the all-round fastness properties of the dyed material, for example light fastness, crock fastness and wet fastness properties, are not adversely affected by the use of the defined acrylic acid and acrylamide polymers.

In particular, by means of the foam application according to the invention it is possible to obtain coloured prints with reactive dyes on cellulose-containing textiles without using customary thickeners, e.g. alginates, cellulose derivatives, starch ethers or bean flour ethers such as carob bean flour ether, which are generally used in large amounts. Adding even small qauntities of the acrylic acid and acrylamide polymers of the type defined gives, according to the invention, print pastes with excellent crispness.

In the following Methods, Preparation Examples and Application Examples, the parts and percentages are by weight, unless otherwise stated.

The amounts are based in the case of the dyes on commercially available, i.e. diluted, material and in the case of the assistants on pure substance. The five-digit Colour Index (C.I.) numbers relate to the 3rd edition of the Colour Index.

METHODS OF PREPARATION

Method 1

A solution of 22.5 g of acrylamide, 2.5 g of an addition product of 52 mol of propylene oxide on 1 mol of glycerol and 0.04 g of potassium peroxodisulfate in 200 g of water is heated to 50° C. with stirring and passing over of nitrogen and is maintained at that temperature for 3 hours. A solution of 0.03 g of potassium peroxodisulfate in 40 g of water is then added dropwise in the course of 60 minutes, and the very viscous solution is diluted by adding 300 ml of water in the course of 30 minutes. The reaction mixture is then maintained at 50° C. for 5 hours, is subsequently treated with 0.6 g of hydroquinone monomethyl ether and 0.12 g of sodium azide, and is cooled down to room temperature with stirring. This gives 565 g of a gel having a polymer content of 4.4%. This gel has a viscosity, measured at 25° C., of 112,957 mPas.

Method 2

A solution of 71.25 g of acrylamide, 3.75 g of an adduct of propylene oxide and glycerol having an average molecular weight of 4200 and 0.09 g of potassium peroxodisulfate in 600 g of water is introduced first and heated to 50° C. with stirring and passing over of nitrogen and then maintained at 50° C. for 3 hours. The viscosity of the solution gradually increases. A solution of 0.06 g of potassium peroxodisulfate in 120 g of water is added dropwise in the course of 60 minutes. About 10 minutes after the start of the dropwise addition the viscosity of the solution becomes so high that 600 g of water must be added in the course of the next 20 minutes. On completion of the dropwise addition of potassium peroxodisulfate solution, the increasingly more viscous solution is maintained at 50° C. for a further 5 hours, being diluted with an additional 400 g of water added a little at a time. 1.7 g of hydroquinone monomethyl ether are added, and the mixture is cooled down with stirring to room temperature to give 1794 g of a free-flowing gel having a polymer content of 4.3%. This gel has a viscosity, measured at 25° C., of 64,202 mPas.

Method 3

A solution of 71.25 g of acrylamide, 3.75 g of an adduct of propylene oxide and pentaerythritol having an average molecular weight of 3350 and 0.09 g of potassium peroxodisulfate in 600 g of water is heated to 50° C. with stirring and passing over of nitrogen and is maintained at 50° C. for 3 hours. The viscosity of the solution gradually increases. A solution of 0.06 g of potassium peroxodisulfate in 120 g of water is then added dropwise in the course of 60 minutes. About 30 minutes after completion of the dropwise addition, the viscosity of the solution increases. For that reason 600 g of water are added during the next 20 minutes. The increasingly more viscous solution is then maintained at 50° C. for a further 4 hours and is thereafter diluted with an additional 400 g of water, 3.4 g of triethanolamine are added, and the solution is cooled down to room temperature with stirring to give 1793 g of a still fluent gel having a solids content of 4.0%. This gel has a viscosity, measured at 25° C., of 75,300 mPas.

Method 4

A solution of 17.8 g of acrylamide, 0.94 g of an addition product of 70 mol of propylene oxide and 6 mol of ethylene oxide on 1 mol of glycerol and 0.025 g of potassium peroxodisulfate in 250 g of water is heated to 50° C. with stirring and passing over of nitrogen and is maintained at that temperature for 3 hours. The temperature of the solution is then raised to 60°–63° C. in the course of 20 minutes until the viscosity increases significantly, and thereafter is cooled down to 55° C. The increasingly more viscous solution is maintained at 55° C. for 5 hours. A solution of 0.45 g of chloroacetamide and 0.45 g of hydroquinone monomethyl ether in 177 g of water is then added to the viscous solution to give 446 g of a gel having a graft polymer content of 4.2%. This gel has a viscosity, measured at 25° C., of 96,750 mPas.

Method 5

Method 4 is repeated, except that the stated addition product is replaced by a further addition product of 53 mol of propylene oxide and 1 mol of trimethylolpropane, affording 446 g of a gel having a graft polymer content of 4.2%. This gel has a viscosity, measured at 25° C., of 19,500 mPas.

Method 6

A solution of 17.24 g of acrylamide, 4.31 g of an addition product of 70 mol of propylene oxide on 1 mol of glycerol and 0.035 g of potassium peroxodisulfate in 200 g of water is heated to 50° C. with stirring and passing over of nitrogen and is maintained at that temperature for 4 hours. The increasingly more viscous solution is then heated to 55° C. for 5 hours. A solution of 0.4 g of chloroacetamide and 0.4 g of hydroquinone monomethyl ether in 291 g of water is then added to the gel to give 513 g of a gel having a polymer content of 4.2%. This gel has a viscosity, measured at 25° C., of 25,750 mPas.

Method 7

A mixture of 15.1 g of acrylamide, 6.5 g of an addition product of 70 mol of propylene oxide on 1 mol of glycerol and 0.025 g of potassium peroxodisulfate in 200 g of water is heated to 50° C. with stirring and passing over of nitrogen and is maintained at that temperature for 3 hours. The increasingly more viscous solution is then heated at 55° C. for 5 hours. A solution of 0.4 g of chloroacetamide and 0.4 g of hydroquinone monomethyl ether in 291 g of water is then added to the gel to give 512 g of a gel having a polymer content of 4.2%. This gel has a viscosity, measured at 25° C., of 16,300 mPas.

Method 8

A mixture of 13 g of acrylamide, 8.7 g of an addition product of 70 mol of propylene oxide on 1 mol of glycerol and 0.015 g of potassium peroxodisulfate in 150 g of water is heated to 50° C. with stirring and passing over of nitrogen and is maintained at that temperature for 4 hours. The increasingly more viscous solution is then heated at 65° C. for 2 hours and at 60° C. for a further 3 hours. A solution of 0.4 g of chloroacetamide and 0.4 g of hydroquinone monomethyl ether in 347 g of water is then added to the gel to give 519 g of a gel having a polymer content of 4.2%. This gel has a viscosity, measured at 25° C., of 15,582 mPas.

PREPARATION EXAMPLES

EXAMPLE 1

A. 98 g of maleic anhydride, 860 g of polyethylene glycol monomethyl ether 430, 300 ml of benzene and 0.5 ml of 93.6% sulfuric acid are refluxed for 8 hours, during which 9.5 ml of water are distilled off azeotropically. The entraining agent is then completely removed, first under a water jet vacuum and later under a high vacuum at a final heating temperature of 90° C. 949 g of polyethylene glycol monomethyl ether 430 maleate are obtained.

B. 117.5 g of the maleate prepared as described in A, 84.7 g of stearyl methacrylate, 3.4 g of tetrabromomethane, 200 ml of toluene and 0.56 g of tert.butyl per-2-ethylbenzoate are heated at 80° C. and maintained at that temperature for 1 hour. A solution of 1.68 g of tert.butyl per-2-ethylhexanoate in 15 ml of toluene is then added dropwise in the course of 3 hours; completion of the addition is followed by polymerization at 80° C. for 2 hours. The solvent is then drawn off, initially under a water jet vacuum and later at 90° C. under a high vacuum, to leave 205 g of a liquid reaction material which solidifies at room temperature to form a waxy material and which constitutes the poly-[stearyl methacrylate-co-polyethylene glycol monomethyl ether 430 maleate].

Melting point=29°-30° C., $M_w$=16,000±3,000 (light scattering) Limiting viscosity $(\eta)$=0.052±0.01 (dl/g)

C. 30 g of the poly-[stearyl methacrylate-co-polyethylene glycol monomethyl ether 430 maleate] prepared as described in B and 150 ml of water are heated at 90° C. A solution of 90 g of acrylic acid in 110 ml of water and a solution of 0.5 g of potassium persulfate in 50 ml of water are then separately added dropwise from two dropping funnels. The thickening which occurs in the course of the graft polymerization is controlled by adding 125 ml of water, so that thorough mixing of reaction material is ensured at all times. The temperature is maintained at 80° C. for 1 hour, and in the course of 30 minutes another solution of 0.25 g of potassium persulfate in 40 ml of water is added dropwise. After 2 hours of subsequent polymerization at 90° C., the reaction product is cooled down to room temperature. 200 ml of water and 5 ml of 30% aqueous sodium hydroxide solution are then added, and stirred in until homogeneous. The readily free-flowing dispersion (800 g) has a solids content of 15%.

EXAMPLE 2

B. 235 g of the maleate prepared as described in Example 1,A., 84.7 g of stearyl methacrylate, 3.4 g of tetrabromomethane, 200 ml of benzene and 0.56 g of tert.butyl per-2-ethylhexanoate are heated after flushing with nitrogen to 80° C. and maintained at that temperature for 1 hour. A solution of 1.68 g of tert.butyl per-2-ethylhexanoate in 15 ml of benzene is then added in the course of 3 hours; completion of the addition is followed by polymerization at 80° C. for 2 hours. Evaporation of the solvent leaves 325 g of poly-(stearyl methacrylate copolyethylene glycol monomethyl ether 430 maleate) limiting viscosity $(\eta)$=0.050 (dl/g). $M_w$=15000±2000.

C. 60 g of the polymaleate prepared as described in B. are heated together with 77.5 ml of water after flushing with nitrogen to 90° C. A solution of 45 g of acrylic acid in 40 ml of water and a solution of 1.0 g of potassium persulfate in 25 ml of water are separately added dropwise from two dropping funnels in such a way that the two volumes are used up at the end. The temperature is maintained at 90° C. for 1 hour, and a solution of 0.5.g of potassium persulfate in 15 ml of water is then added dropwise, which is followed by 4 hours of polymerization. The reaction mixture is cooled to room temperature, and 3.35 g of 30% sodium hydroxide solution are added dropwise. 266 g are obtained of a readily free-flowing dispersion having an active substance content of 39.5%. Ratio of polymaleate to acrylic acid 1:0.75.

EXAMPLE 3

90 g of the poly-(stearyl methacrylate copolyethylene glycol monomethyl ether 430 maleate) prepared as described in Example 2,B. and 60 ml of water are heated after flushing with nitrogen to 90° C. A solution of 33.75 g of acrylic acid in 16.3 ml of water and a solution of 1.5 g of potassium persulfate in 30 ml of water are then separately added dropwise from two dropping funnels in such a way that the two volumes are used up at the same time. The temperature is maintained at 90° C. for 1 hour, and another solution of 0.75 g of potassium persulfate in 17.5 ml of water is added dropwise. This is followed by 3 hours of polymerization. The reaction mixture is cooled to room temperature, and 2.5 g of 30% sodium hydroxide solution are added. 250 g are obtained of a readily free-flowing dispersion having an active substance content of 49.7%.

Ratio of polymaleate to acrylic acid 1:0.375.

EXAMPLE 4

30 g of the poly-(stearyl methacrylate copolyethylene glycol monomethyl ether 430 maleate) prepared as described in Example 2,B. and 150 ml of water are heated after flushing with nitrogen to 90° C. A solution of 45 g of acrylic acid in 60 ml of water and a solution of 0.5 g of potassium persulfate in 30 ml of water are then separately added dropwise from two dropping funnels in such a way that the two volumes are used up at the same time. In the course of the addition, 90 ml of water are added as well a little at a time. The temperature is maintained at 90° C. for 1 hour, and another solution of 0.25 g of potassium persulfate in 40 ml of water is added dropwise. This is followed by 2 hours of polymerization. The reaction mixture is cooled down to room temperature, diluted with 52.5 ml of water and treated with 3.35 g of 30% sodium hydroxide solution. 500.8 g are obtained of a readily free-flowing dispersion having an active substance content of 15%.

Ratio of polymaleate to acrylic acid 1:1.5.

APPLICATION EXAMPLES

EXAMPLE 1

A printed paste is prepared, containing in 1 liter of water the following additives:
80 g of a dye of the formula

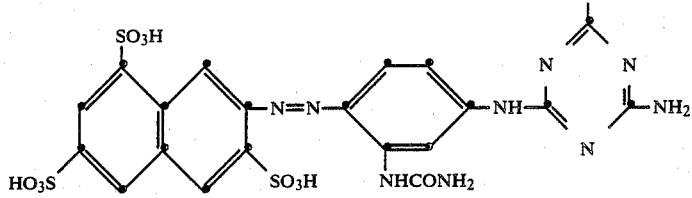 (11)

200 g of an aqueous mixture which contains 30 g of an addition product of 2 mol of ethylene oxide or 1 mol of cetyl alcohol and 0.1 g of sodium lauryl sulfate,
20 g of graft polymer prepared in accordance with Method 2,
30 g of the 15% polymerization product prepared in accordance with Example 1,C.,
10 g of the sodium salt of m-nitrobenzenesulfonic acid,
100 g of a 25% aqueous sodium carbonate solution and
100 g of urea.

The print paste is then foamed in an enclosed system by means of a foam-producing apparatus. The foam has a weight per liter of 200 g and a drop outflow time of over 30 hours.

This foam is forced through pipes and a screen onto a cotton fabric under a pressure of 2.5 bar. The printed fabric is then dried, steamed at 102° C. for 8 minutes, and then as usual soaped off and dried.

The result obtained is a strong, level and crisp golden yellow print having an excellent handle and good all-round fastness properties.

Similar satisfactory prints are obtained when using in place of the graft polymer prepared in accordance with Method 2 the same amounts of the graft polymers prepared in accordance with Methods 1 and 3 to 8 and of a polyacrylamide in the form of a 4% aqueous solution having a viscosity of 28,000 cps, measured at 25° C.

EXAMPLE 2

A print paste is prepared, containing in 1 liter of water the following additives:
80 g of the dye Reactive Orange 13, C.I. 18,270
200 g of an aqueous mixture which contains 30.0 g of an addition product of 2 mol of ethylene oxide on 1 mol of cetyl alcohol and 0.1 g of sodium laurylsulfate,
20 g of the graft polymer prepared in accordance with Method 2,
30 g of the 15% polymerization product prepared in accordance with Example 1,C.,
10 g of the sodium salt of m-nitrobenzenesulfonic acid,
100 g of a 25% aqueous sodium carbonate solution and
100 g of urea.

The print paste is then foamed in an enclosed system by means of a foam-producing apparatus. The foam has a weight per liter of 200 g. Drop outflow time: 48 hours.

This foam is forced through pipes and a screen onto a cotton fabric under a pressure of 2.5 bar. The printed fabric is then dried, steamed at 101° C. for 8 minutes, and then as usual rinsed and dried again.

The result obtained is a level, orange print having good fastness properties.

EXAMPLE 3

A print paste is prepared, containing in 1 liter of water the following additives:
150 g of a dye of the formula

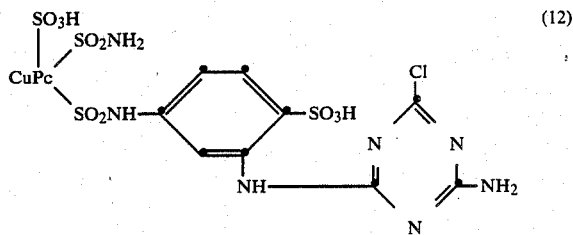 (12)

200 g of an aqueous mixture which contains 30.0 g of an addition product of 2 mol of ethylene oxide on 1 mol of cetyl alcohol and 0.1 g of sodium laurylsulfate,
20 g of the graft polymer prepared in accordance with Method 2,
10 g of the sodium salt of m-nitrobenzenesulfonic acid,
30 g of the 15% polymerization product prepared in accordance with Example 1,C.,
100 g of a 25% aqueous sodium carbonate solution and
100 g of urea.

The print paste is then foamed in an enclosed system by means of a foam-producing apparatus. The foam has a weight per liter of 200 g. Drop outflow time: 20 hours.

The foam is forced through pipes and a screen onto a cotton fabric under a pressure of 2.5 bar. The printed fabric is then dried, steamed at 101° C. for 8 minutes, and then as usual rinsed and dried again.

The result obtained is a level, brilliant turquoise blue print having good fastness properties.

EXAMPLE 4

A print paste is prepared, containing in 1 liter of water the following additives:
90 g of a dye of the formula

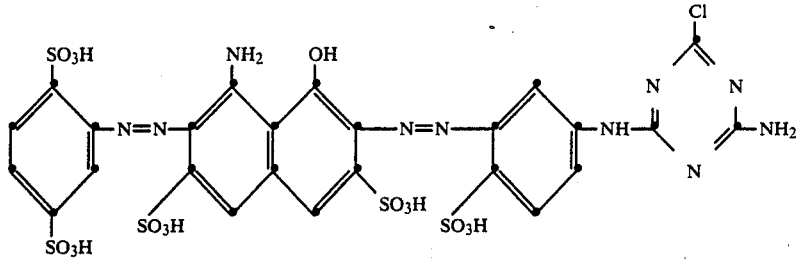

(13)

30 g of a 15% polymerization product prepared in accordance with Example 1.C.,
200 g of an aqueous mixture which contains 30 g of an addition product of 2 mol of ethylene oxide on 1 mol of cetyl alcohol and 0.1 g of sodium laurylsulfate,
20 g of the graft polymer prepared in accordance with Method 2,
10 g of the sodium salt of m-nitrobenzenesulfonic acid,
100 g of a 25% aqueous sodium carbonate solution and
100 g of urea.

The print paste is then foamed in an enclosed system by means of a foam-producing apparatus. The foam has a weight per liter of 200 g. Drop outflow time: 70 hours.

This foam is forced through pipes and a screen onto a cotton fabric under a pressure of 2.5 bar. The printed fabric is then dried, steamed at 101° C. for 8 minutes, and then as usual soaped off and dried again.

The result obtained is a strong, level and crisp navy blue print having excellent handle and good allround fastness properties.

EXAMPLE 5

A print paste is prepared, containing in 1 liter of water, the following additives:
200 g of a dye of the formula 150 g of an aqueous mixture which contains 22.5 g of an addition product of 2 mol of ethylene oxide on 1 mol of cetyl alcohol and 0.11 g of sodium laurylsulfate,
20 g of the graft polymer prepared in accordance with Method 2,
3.7 g of the acrylic acid graft polymer prepared in accordance with Example 2,
10 g of the sodium salt of m-nitrobenzenesulfonic acid,
100 g of a 25% aqueous sodium carbonate solution and
100 g of urea.

The print paste is then foamed in an enclosed system by means of a foam-producing apparatus. The foam has a weight per liter of 185 g and a drop outflow time of over 48 hours.

This foam is forced through pipes and a screen onto a cotton fabric under a pressure of 2.5 bar. The printed fabric is then dried, steamed at 102° C. for 8 minutes, and then as usual soaped off and dried again.

The result obtained is a strong, level and crisp blue print having excellent handle and good allround fastness properties.

Similar satisfactory prints are obtained on replacing the 0.11 g of sodium laurylsulfate by 1.8 g of sodium dodecylbenzenesulfonate.

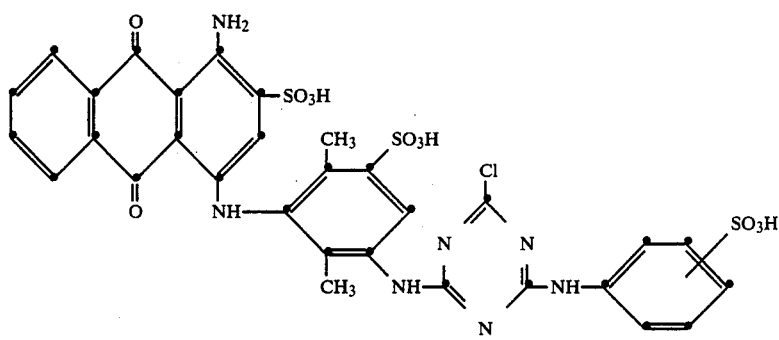

(14)

in 40% liquid form

EXAMPLE 6

A print paste is prepared, containing in 1 liter of water the following additives:
150 g of a dye of the formula

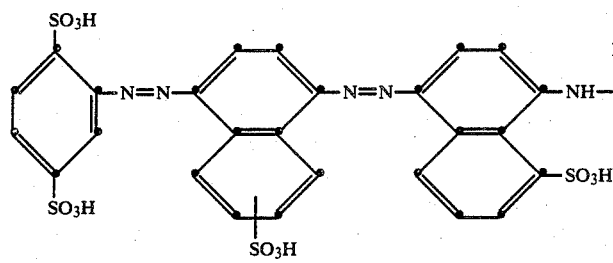
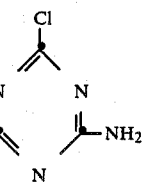

in 50% liquid form
150 g of an aqueous mixture which contains 22.5 g of an addition product of 2 mol of ethylene oxide on 1 mol of cetyl alcohol and 0.11 g of sodium laurylsulfate,
20 g of the graft polymer prepared in accordance with Method 2,
20 g of the acrylic acid graft polymer prepared in accordance with Example 3,
10 g of the sodium salt of m-nitrobenzenesulfonic acid,
100 g of a 25% aqueous sodium carbonate solution and
100 g of urea.

The print paste is then foamed in an enclosed system by means of a foam-producing apparatus. The foam has a weight per liter of 167 g and a drop outflow time of over 20 hours.

This foam is forced through pipes and a screen onto a cotton fabric under a pressure of 2.5 bar. The printed fabric is then dried, steamed at 102° C. for 8 minutes, and then as usual soaped off and dried again.

The result obtained is a strong, level and crisp brown print having excellent handle and good allround fastness properties.

What is claimed is:

1. A process for printing or dyeing cellulose-containing textile material with reactive dyes by printing or dyeing the textile material with a foamed, aqueous preparation and fixing the dyes through the action of heat, the preparation containing a reactive dye, a foaming agent, a fixing alkali, a homopolymer or copolymer of acrylamide or methacrylamide or a graft polymer which is obtainable from an addition product of an alkylene oxide onto an at least trihydric aliphatic alcohol having 3 to 10 carbon atoms and acrylamide or methacrylamide, wherein the preparation additionally contains a graft polymer which possesses as grafting base a copolymerization product from (A) an alkyl acrylate or methacrylate, the alkyl radical having at least 8 carbon atoms, with (B) a dicarboxylic acid diester of an ethylenically unsaturated aliphatic dicarboxylic acid and a polyethylene glycol, a terminal hydroxyl group of the glycol having been etherified with a $C_1$-$C_{14}$-alkyl radical, and contains as graft constituent side chains which stem from a grafted-on polymerizable monomer which is an ethylenically unsaturated mono- or di- carboxylic acid or a sulfonic acid in each case having at most seven carbon atoms.

2. A process according to claim 1, wherein the copolymerization product used as grafting base is based on 1 mole of dicarboxylic acid ester (B) and 2 moles of alkyl acrylate or alkyl methacrylate (A).

3. A process according to claim 1, wherein the dicarboxylic acid diester (B) stems from maleic anhydride.

4. A process according to claim 1, wherein the dicarboxylic acid diester (B) is obtained with a monoetherified diol of the formula HO—(CH$_2$CH$_2$)$_m$R in which R is $C_1$-$C_{14}$-alkyl and m is 5 to 100.

5. A process according to claim 1, wherein the alkyl acrylate or methacrylate used as component (A) is derived from an aliphatic monoalcohol having 8 to 22 carbon atoms.

6. A process according to claim 1, wherein the copolymerization product contains side chains which stem from grafted-on acrylic acid.

7. A process according to claim 1, wherein the preparation contains a graft polymer which is obtainable by graft polymerization of acrylamide or methacrylamide on an addition product of 40 to 80 moles of propylene oxide on a trihydric to hexahydric alkanol having 3 to 6 carbon atoms.

8. A process according to claim 7, wherein the graft polymer contains 4 to 20% by weight of the addition product of 40 to 80 moles of propylene oxide on 1 mole of glycerol and 80 to 96% by weight of grafted-on acrylamide, based on the graft polymer.

9. A process according to claim 1, wherein the preparation contains as foam-forming agent a mixture of alkylsulfonates having 8 to 10 carbon atoms and fatty alcohols having 12 to 22 carbon atoms or addition products of 1 to 4 moles of ethylene oxide on 1 mole of these fatty alcohols.

10. A process according to claim 1, wherein the preparation contains as foam-forming agent a mixture of addition products of 2 to 12 moles of ethylene oxide on 1 mole of alkylphenol having 4 to 12 carbon atoms in the alkyl moiety, sodium salts of sulfuric acid esters of fatty alcohol/ethylene oxide adducts having 10 to 12 carbon atoms in the alcohol moiety and 2 to 4 ethylene oxide units and fatty acid diethanolamides having 8 to 18 carbon atoms in the fatty acid radical.

11. A process according to claim 1, wherein the preparation contains as foam-forming agent a mixture of addition products of 1 to 15 moles of ethylene oxide on 1 mole of fatty alcohol having 12 to 22 carbon atoms and fatty acid diethanolamides having 8 to 18 carbon atoms in the fatty acid radical.

12. A process according to claim 1, wherein printing is effected by means of a screen printing machine.

13. A process according to claim 12, wherein the preparation is applied to a sieve or sievelike support and is forced through the sieve or the sievelike support.

14. A process according to claim 1, wherein fixing of the dye is effected by steaming.

15. A process according to claim 1, wherein fixing of the dye is effected by thermosoling.

16. An aqueous preparation for printing or dyeing cellulose-containing textile material, containing reactive dyes, foaming agents, fixing alkalis, homopolymers or copolymers of acrylamide or methacrylamide or graft polymers which are obtainable from an addition product of an alkylene oxide on an at least trihydric aliphatic alcohol having 3 to 10 carbon atoms and acrylamide or methacrylamide, wherein the preparation additionally cohtains graft polymers which possess as grafting base a copolymerization product from (A) an alkyl acrylate or methacrylate, the alkyl radical having at least 8 carbon atoms, with (B) a dicarboxylic acid diester of an ethylenically unsaturated aliphatic dicarboxylic acid and a polyethylene glycol, a terminal hydroxyl group of the diol having been etherified with a $C_1$–$C_4$-alkyl radical, and contain as graft constituent side chains which stem from grafted-on polymerizable monomers which contain hydrophilic groups.

17. An aqueous preparation according to claim 16, in foamed form.

* * * * *